United States Patent
Park et al.

(10) Patent No.: US 12,309,571 B2
(45) Date of Patent: May 20, 2025

(54) METHOD AND APPARATUS FOR EDGE DETECTION FOR DIFFRACTION OF SOUND TRACING

(71) Applicant: INDUSTRY ACADEMY COOPERATION FOUNDATION OF SEJONG UNIVERSITY, Seoul (KR)

(72) Inventors: Woo Chan Park, Seoul (KR); Eunjae Kim, Seoul (KR); Ji Young Kim, Seoul (KR); In Hwa Choi, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 18/022,874

(22) PCT Filed: Oct. 7, 2022

(86) PCT No.: PCT/KR2022/015087
§ 371 (c)(1),
(2) Date: Feb. 23, 2023

(87) PCT Pub. No.: WO2023/120902
PCT Pub. Date: Jun. 29, 2023

(65) Prior Publication Data
US 2025/0080938 A1    Mar. 6, 2025

(30) Foreign Application Priority Data
Dec. 20, 2021  (KR) .......... 10-2021-0183124

(51) Int. Cl.
*H04R 5/02* (2006.01)
*H04R 1/32* (2006.01)
*H04S 7/00* (2006.01)

(52) U.S. Cl.
CPC .............. *H04S 7/302* (2013.01); *H04R 1/32* (2013.01)

(58) Field of Classification Search
CPC .................................. H04S 7/302; H04R 1/32
(Continued)

(56) References Cited

U.S. PATENT DOCUMENTS
9,241,212 B2   1/2016   Hur et al.

FOREIGN PATENT DOCUMENTS
KR   10-1828908 B1     2/2018
KR   10-2019179 B1 *  12/2018   ............. H04S 7/302
(Continued)

OTHER PUBLICATIONS

Fast Diffraction Pathfinding for Dynamic Sound Propagation. ACM Transactions on Graphics. vol. 40, No. 4, Article No. 138, pp. 1-13, Aug. 2021 (Year: 2021).*
(Continued)

*Primary Examiner* — Ammar T Hamid
(74) *Attorney, Agent, or Firm* — Paratus Law Group, PLLC

(57) ABSTRACT

There is provided a method and apparatus for edge detection for diffraction of sound tracing, and the method includes a triangle detection step for detecting hit triangles hit with a ray departing from a sound source; and an edge detection step for calculating at least an edge point based on the hit triangles and determining whether diffraction occurs on the edge point by performing an intersection test for a test ray departing toward the at least edge point based on the sound source or a listener.

10 Claims, 5 Drawing Sheets

(58) Field of Classification Search
USPC .................................................... 381/310, 33
See application file for complete search history.

(56) References Cited

FOREIGN PATENT DOCUMENTS

| KR | 10-1955552 B1 | 3/2019 |
| KR | 10-2117932 B1 | 6/2020 |

OTHER PUBLICATIONS

International Search Report for PCT/KR2022/015087 mailed Feb. 22, 2023 from Korean Intellectual Property Office.
Carl Schissler et al., "Fast Diffraction Pathfinding for Dynamic Sound Propagation", ACM Transactions on Graphics, Aug. 2021, pp. 1-13, vol. 40, No. 4.

* cited by examiner (a)      (b)      (c)      (d)

METHOD AND APPARATUS FOR EDGE DETECTION FOR DIFFRACTION OF SOUND TRACING

CROSS-REFERENCE TO PRIOR APPLICATIONS

This application is a National Stage Patent Application of PCT International Patent Application No. PCT/KR2022/015087 (filed on Oct. 7, 2022) under 35 U.S.C. § 371, which claims priority to Korean Patent Application No. 10-2021-0183124 (filed on Dec. 20, 2021), which are all hereby incorporated by reference in their entirety.

BACKGROUND

The present disclosure relates to a 3-dimensional (3D) sound processing technique, and more particularly, to a method and apparatus for edge detection for diffraction of sound tracing which can process sound rendering for a dynamic scene by calculating edge candidates diffractable during a run time in the sound tracing process.

In order to support a realistic virtual reality environment, a reproduction of a high quality auditory sense of space through a virtual space is required. For this, the 3D sound technique using a head related transfer function (HRTF) may be used basically.

According to the conventional 3D sound technique, an auditory sense of space may be reproduced by using a precalculated sound conditioning filter or within a simple virtual space such as a rectangular shoe box. Since the physical effect is not reflected in the surrounding environment in the virtual space and the material of the complex object, the technique may have a restriction for reproducing realistic sound.

To solve this, a 3D sound technique based on a geometric acoustic (GA) method has been continually published. Among the methods, the method of fusing a ray tracing technique of 3D graphics and a sound processing technique may be called a sound tracing or sound ray tracing. The sound tracing is a type of sound rendering technique and may correspond to a technique of generating sound by tracing a sound propagation path between a listener and a sound source.

The sound tracing technique may generate various sound propagation paths such as a direct path, a reflection path and an edge-diffraction path to reproduce realistic sound. Particularly, diffraction is an effect of sound transferred to a shaded area and is indispensable to generate a realistic sound source. However, since the edge-diffraction is accompanied by an edge-detection algorithm to find an edge, the realtime processing may be very difficult. Accordingly, in the conventional techniques, the edge-detection is performed in a pre-processing step, and owing to this, it may be very difficult to apply the edge-detection in processing of a dynamic scene.

PRIOR ART REFERENCES

Patent Literature

Korean Patent No. 10-1828908 (2018.02.07)

SUMMARY

An embodiment of the present disclosure is to provide a method and apparatus for edge detection for diffraction of sound tracing which can process sound rendering for a dynamic scene by calculating edge candidates diffractable during a run time in the sound tracing process.

In one embodiment, an edge detection method for diffraction of sound tracing includes: a triangle detection step for detecting hit triangles hit with a ray departing from a sound source; and an edge detection step for calculating at least an edge point based on the hit triangles and determining whether diffraction occurs on the edge point by performing an intersection test for a test ray departing toward the at least edge point based on the sound source or a listener.

The triangle detection step may include: generating a ray by defining an origin and a direction; searching an acceleration structure (AS) for a 3-dimensional space in which the sound source is located; and determining the hit triangles by performing the intersection test between the ray and the triangle while searching the triangles of the acceleration structure.

The edge detection step may include: determining an edge between the hit triangle and an adjacent triangle; determining a point closest to a straight line between the sound source and the listener as an edge point among the points on the edge; and generating at least one sub-edge point by moving a predetermined value in a specific direction from the edge point.

The edge detection step may include: representing the edge and the straight line with first and second vector equations; defining a first vector that connects the edge and starting points of the straight line and a second vector that connects the closest points between the edge and the straight line; representing the edge point with a vector equation by defining a size of vector u of the first vector equation as an unknown number; and calculating the edge point by calculating the unknown number through a dot product between each of the edge and the straight line and the second vector.

The edge detection step may include: generating two different sub-edge points by moving the predetermined value in a positive direction and a negative direction according to the specific direction based on the edge point.

The edge detection step may include: determining a first sub-edge point between the two sub-edge points when the sub-edge point is close to the listener and determining a second sub-edge point between the two sub-edge points when the sub-edge point is close to the sound source.

The edge detection step may include: generating a first test ray departing toward a first sub-edge point from the listener; generating a second test ray departing toward a second sub-edge point from the listener; and generating a third test ray departing toward the second sub-edge point from the sound source.

The edge detection step may include: determining diffraction in the edge point based on the first test ray hitting the hit triangle, and the second and third rays not hitting the hit triangle.

The edge detection step may be repeatedly performed for each of the hit triangles.

In one embodiment, an edge detection device for diffraction of sound tracing includes: a triangle detection processing unit for detecting hit triangles hit with a ray departing from a sound source; and an edge detection processing unit for calculating at least an edge point based on the hit triangles and determining whether diffraction occurs on the edge point by performing an intersection test for a test ray departing toward the at least edge point based on the sound source or a listener.

The edge detection processing unit may determine an edge between the hit triangle and an adjacent triangle and determine a point closest to a straight line between the sound source and the listener as an edge point among the points on the edge.

The edge detection processing unit may generate two different sub-edge points by moving the predetermined value in a positive direction and a negative direction according to the specific direction based on the edge point.

The edge detection processing unit may determine a first sub-edge point between the two sub-edge points when the sub-edge point is close to the listener and determine a second sub-edge point between the two sub-edge points when the sub-edge point is close to the sound source.

The edge detection processing unit may determine whether diffraction occurs on the edge point based on a first test ray departing toward a first sub-edge point from the listener, a second test ray departing toward a second sub-edge point from the listener, and a third test ray departing toward the second sub-edge point from the sound source.

The disclosed technique may have the following effects. However, this does not mean that a specific embodiment needs to have all the following effects or only the following effects, and the scope of the disclosed technique is not limited thereto.

According to the method and apparatus for edge detection for diffraction of sound tracing according to the present disclosure, the sound rendering for a dynamic scene may be processed in realtime by calculating edge candidates diffractable during a run time in the sound tracing process.

According to the conventional method, the diffractable edge candidates may be calculated in advance in a pre-processing step, and the method may be proper for the diffraction for a static scene, but may not be proper for the diffraction for a dynamic scene.

According to the method and apparatus for edge detection for diffraction of sound tracing according to the present disclosure, the diffractable edges may be calculated in realtime during a run time, and a performance of diffraction may also be available even in a dynamic scene as well as a static scene, and the edge detection is performed during a run time in a dynamic scene, and the highly immersive and realistic sound may be provided to users.

DETAILED DESCRIPTION

Figure 1:
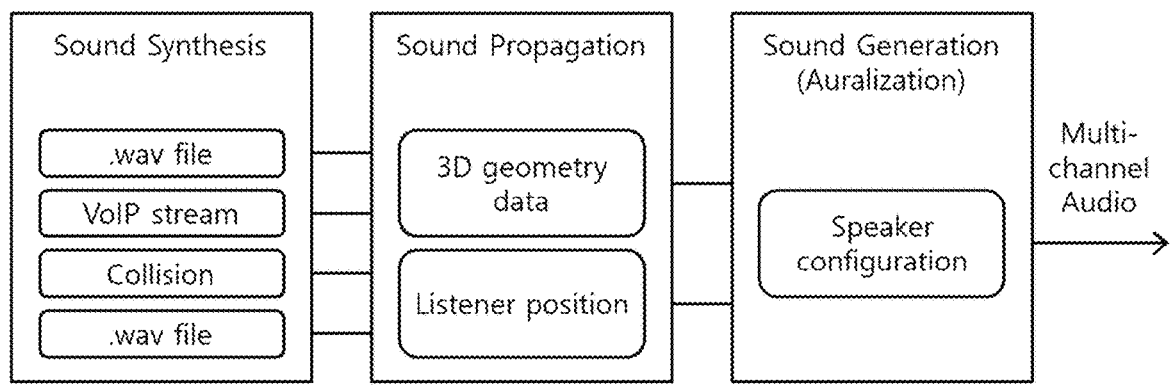
FIG. 1 is a diagram illustrating a pipeline of sound tracing.

Description of the present disclosure is merely an embodiment for structural or functional explanation and thus the scope of the present disclosure should not be interpreted as being limited by embodiments described in the specification. That is, embodiments can be modified in various manners and have various forms and thus the scope of the present disclosure should be understood to include equivalents that can realize the technical ideas. In addition, the objectives and effects proposed in the present disclosure are not intended to be included in a specific embodiment or only the effects are not intended to be included therein, and thus, the scope of the present disclosure should not be understood to be limited thereby.

Meanwhile, the terms used in the present application should be understood as follows.

Terms such as "first" and "second" are used to distinguish one component from another component and the scope of the present disclosure is not limited by such terms. For example, a first element may be called a second element and the second element may be called the first element.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements. Further, other expressions for describing a relationship between elements, that is, "between", "directly between", "adjacent to", "directly adjacent to" and the like should be interpreted in the same manner.

An element described in the singular form is intended to include a plurality of elements unless the context clearly indicates otherwise. In addition, in the specification of the present disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

In the method invention, identification codes (e.g., a, b, c, etc.) in each step is just used for the convenience of description, and the identification codes do not limit the order of steps, and steps may be performed in different order from the described order unless the context clearly indicates otherwise. That is, steps may be performed in the same order as the described one, performed substantially simultaneously or performed in reverse order.

The present disclosure can be implemented with computer-readable code in a computer-readable recording medium, and the computer-readable recording medium may include all kinds of recording devices capable of storing data readable by a computer system. Examples of the computer-readable medium may include a ROM, a RAM, a CD-ROM, magnetic tapes, floppy disks, optical data storage devices, and the like. Further, the computer-readable recording medium is distributed to a computer system connected via a network and computer-readable code can be saved and executed according to a distributed system.

It is to be noted that most terms disclosed in the present disclosure correspond to general terms well known in the art. Terms defined in generally used dictionaries should be interpreted as being consistent with contextual meanings of related art and cannot be interpreted as having ideal or excessively formal meanings unless clearly defined in the present application.

FIG. 1 is a diagram illustrating a pipeline of sound tracing.

Referring to FIG. 1, a sound tracing pipeline may include a sound synthesis step, a sound propagation step, and a sound generation (auralization) step. Among the sound tracing processing steps, the sound propagation step may correspond to the most important step to provide immersive sense to virtual reality and may correspond to a step of high calculation complexity and taking the longest time. Furthermore, an acceleration of the step may affect the realtime processing of sound tracing.

The sound synthesis step may correspond to a step of generating a sound effect according to an interaction between users. For example, the sound synthesis may perform a processing for the sound generated when a user knocks on a door or drops an object and may correspond to a technique generally used in the conventional game or UI.

The sound propagation step may be a step of simulating the process of the synthesized sound being delivered to a listener through virtual reality and may correspond to a step of processing the sound property (reflection coefficient, absorption coefficient, etc.) and the property of sound (reflection, absorption, transmission, etc.) in virtual reality based on the scene geometry of virtual reality.

The sound generation step may correspond to a step of regenerating input sound based on the construction of a listener speaker by using a property value (reflection/absorption/transmission coefficients, attenuation property, etc.) of the sound calculated in the sound propagation step.

Figure 2:
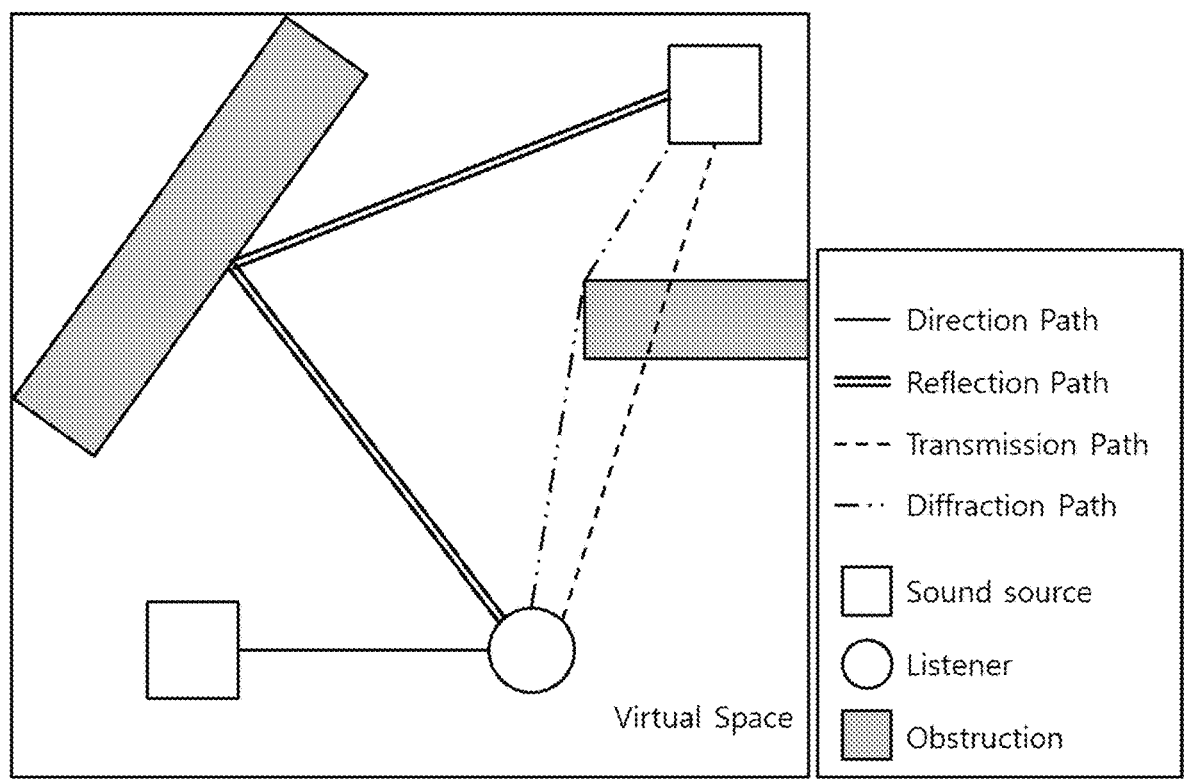
FIG. 2 is a diagram illustrating a type of sound propagation path.

FIG. 2 is a diagram illustrating a type of sound propagation paths.

Referring to FIG. 2, a direct path may correspond to a path through which sound is delivered directly without any obstruction between a listener and a sound source. A reflection path may correspond to a path through which sound collides with an obstacle and reflected, and then arrives at a listener, and a transmission path may correspond to a path through which sound is transmitted through an obstacle and delivered to a listener when the obstacle is present between the listener and a sound source.

In the sound tracing, a ray may be shot in each position of a plurality of source sources.

Each of the shooting rays may find a collided geometrical object, and rays corresponding to reflection, transmission, and diffraction may be generated with respect to the collided object. This process may be repeatedly performed recursively. The rays shot from the sound sources may meet the rays shot from the listener, and the meeting path may be called a sound propagation path. Consequently, the sound propagation path may mean a valid path through which the sound starting from a sound source position arrives at the listener throughout reflection, transmission, and diffraction. A final sound may be calculated by using the sound propagation path.

Meanwhile, the sound propagation processing may include a setup processing step, a ray generation step, a traversal/intersection test step, a hit point calculation step, a PPVnRGC step, and an IR calculation step.

The setup processing step may correspond to a step of controlling a switching of a mode of a sound propagation unit (SPU) and configuring guide ray information generated from a listener for a visibility test and information required to generate reverb ray information from a sound source. After the configuration is completed, either one of the guide ray information generated in the setup processing step or the reverb ray information or reflection ray information generated through a PPV (step S450) is selected according to the mode (SPU mode) of the sound propagation unit, and this may be delivered to the ray generation step.

In the ray generation step, a ray is generated based on the ray information generated in the setup processing step, and an origin and a direction of the ray may be calculated. The generated ray may be stored in a TnI input buffer which is a space in which the input data for a traversal/intersection test is stored.

In the traversal/intersection test (TnI) step, the ray generated in the ray generation step is read from the TnI input buffer, and a presence of a triangle hit with the ray is examined in an acceleration structure. For the collision test, a TnI unit may perform a traversal for the acceleration structure and a ray-triangle intersection test repeatedly. The test result of the TnI unit may be stored in a TnI output buffer.

In the hit point calculation step, an intersection point between the ray and the geometry may be calculated based on the result delivered from the TnI input buffer. In the case that the ray is hit, triangle information data (triangle info. data) for the hit triangle ID may be requested. The calculated result and the triangle information data (triangle info. data) may be delivered to perform PPVnRGC.

The PPVnRGC step is a core functional block of performing the sound propagation simulation, and may determine whether to perform a reflection sound path test or a reverb geometry collection based on the ray property of the delivered data. The PPVnRGC step may include a propagation path validator (PPV) and a reverb geometry collector (RGC).

The PPV step is a step of performing a search for a direct, transmission, reflection, and diffraction sound path. Typically, a PPV may use a uniform theory diffraction (UTD) method to find a diffraction sound path and use an image source method to find a reflection sound path. In the case that a direct sound path, a transmission sound path, a diffraction sound path, or a reflection sound path is found, the PPV may generate information required for an impulse response calculation and deliver the information to an IR calculator.

The RGC may use the reverb geometry information required for the reverb time calculation. The reverb time is one of the important factors for generating reverb sound, and a general statistical sound model may be used to calculate the reverb time. Among these, Eyring model is a model for calculating energy decay within a single space and is frequently used owing to the speed and the simplicity. For the reverb time calculation, a valid path triangle found through a propagation path test and a reverb triangle, which is hit triangle information, found using the reverb ray may be used among the triangle information hit with the guide ray.

In this case, if the entire path triangle is not generated, the reverb may not be calculated, and the sound path mode may be repeatedly performed until the entire path triangle information is generated. When the information of the path triangle and the reverb triangle is prepared, a sorting may be performed to process a removal of the overlapped triangle in the path triangle and the reverb triangle and an ID comparison between the path triangle and the reverb triangle quickly and efficiently. By comparing the IDs of the path triangle and the reverb triangle which are sorted, a triangle for the same ID may be found, and valid reverberation information may be calculated.

The calculated reverberation data may be forwarded to the IR calculator.

Finally, in the IR calculation step, the impulse response (IR) or the reverb impulse response (reverb IR) of the valid direct/transmission, reflection, and diffraction paths processed from the PPVnRGC step may be calculated and stored in a valid path buffer. When the path data is stored in the valid path buffer, the sound propagation performance for a current frame is completed, and this may be forwarded to an auralization process step.

Figure 3:
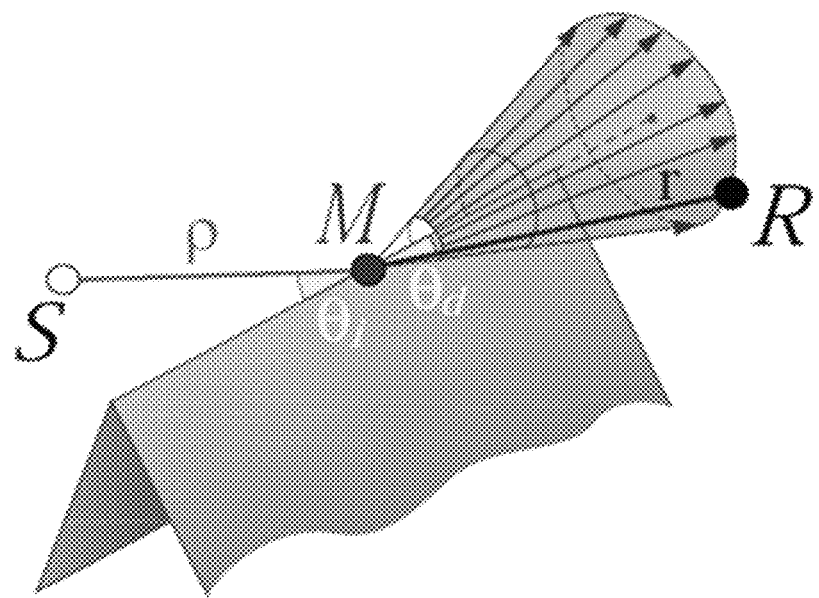
FIG. 3 is a diagram illustrating an edge-diffraction path.

FIG. 3 is a diagram illustrating an edge-diffraction path.

Referring to FIG. 3, the edge-diffraction may mean the phenomenon that sound is sent to a shadow region through an edge of an obstable placed between a sound source and a listener. The edge-diffraction of a GA scheme may be divided into Biot-Tolstoy-Medwin (BTM) and uniform theory of diffraction (UTD). Among these, it has been known that the UTD scheme is proper for a realtime attainment.

Three main tasks may be performed to find an edge-diffraction path. First, edge candidates may be found by using the edge detection algorithm. Second, whether the edge candidates satisfy the UTD condition may be examined. Lastly, a frequency-band based impulse response (IR) may be calculated based on the edges that satisfy the UTD condition.

In the first step, the edge detection step may correspond to a step that requires high cost. Owing to this reason, according to the conventional solution, the edge detection is preprocessed in a pre-processing step, and diffractable edge candidates may be stored among all edges.

In the second step, it may be examined whether the edge candidates generate a diffraction path based on a position of a listener. This may be determined depending on whether the listener is located within a shadow region in which the listener is not directly shown from a sound source. Lastly, an IR may be calculated for every frequency band based on the edge that passes through the steps. For this, a distance between the edge and the listener, a distance between the edge and the sound source, and an angle of the edge and triangles may be calculated. The factors are inserted into the IR calculation formula based on the UTD, and the final IR may be generated.

Figure 4:
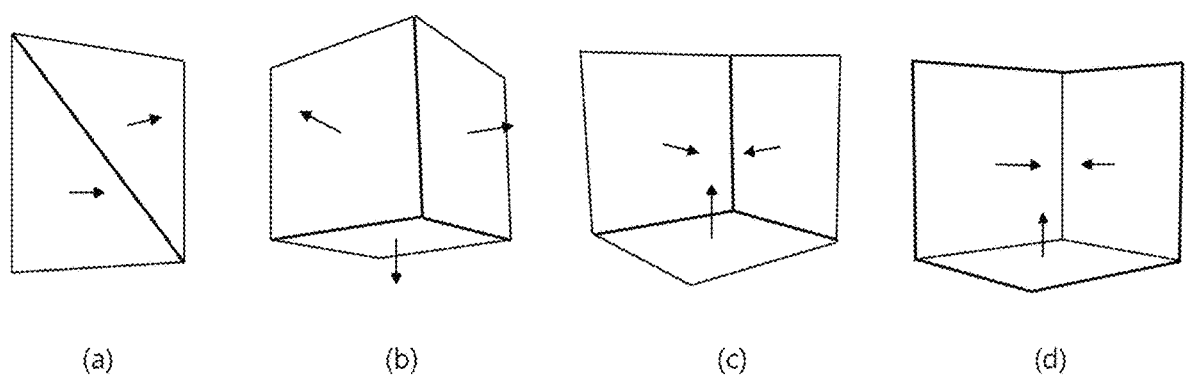
FIG. 4 is a diagram illustrating an edge detection method using a pre-processing step.

FIG. 4 is a diagram illustrating an edge detection method using a pre-processing step.

Referring to FIG. 4, an edge detection may be performed through a pre-processing step in the conventional method. According to the method, an edge is classified into 4 shapes, and diffractable edges may be selected. FIG. 4(a) shows triangles that share an edge. The triangles shown in FIG. 4(a) may have a normal (i.e., corresponding to an arrow) in the same direction. In this case, it is determined that diffraction does not occur.

FIG. 4(b) also shows triangles that share an edge. The triangles shown in FIG. 4(b) may have a normal in a different direction from each other. In this case, this is determined to be an edge in which diffraction occurs. FIG. 4(c) and FIG. 4(d) show that a normal of respective triangle faces an inside.

FIG. 4(c) shows the case that there are triangles that share an edge, and FIG. 4(d) shows the case that there is no triangle that shares an edge. In the case of FIG. 4(c) and FIG. 4(d), depending on a scene design, a user may set separately whether the edge is a directly diffractable edge.

The tasks may be performed for the edges of all triangles, and edge candidates may be selected. After the task is performed, according to the sound tracing, whether there is an edge candidate based on the triangles hit with the ray shot from a sound source during a run-time. If there is an edge candidate, according to the sound tracing, whether a listener is in a shadow region may be examined from an edge. If the listener is in the shadow region, a diffraction IR may be calculated based on the edge.

Figure 5:
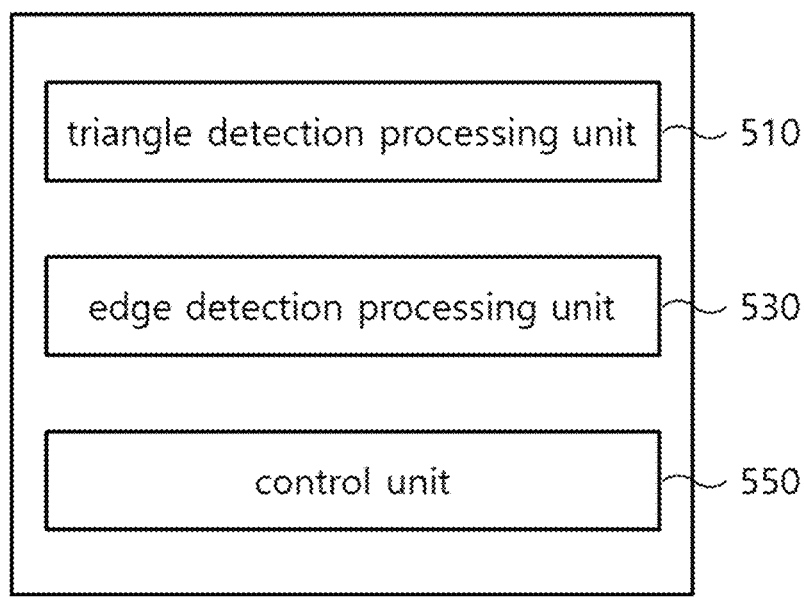
FIG. 5 is a diagram illustrating a function configuration of an edge detection device according to the present disclosure.

FIG. 5 is a diagram illustrating a function configuration of an edge detection device according to the present disclosure.

Referring to FIG. 5, an edge detection device 130 may include a triangle detection processing unit 510, an edge detection processing unit 530, and a control unit 550.

The triangle detection processing unit 510 may detect hit triangles that collide with a ray departing from a sound source. That is, the triangle detection processing unit 510 may perform the sound propagation step of the sound tracing process, and the sound propagation step may correspond to the step of performing a generation, a search, and a hit test of the ray sequentially.

In one embodiment, the triangle detection processing unit 510 may generate a ray by defining an origin and a direction, search an acceleration structure (AS) for a 3-dimensional space, and determine hit triangles by performing an intersection test between the ray and the triangle while searching the triangles of the acceleration structure. In this case, the acceleration structure may be generated independently with respect to a static scene and a dynamic scene. The triangle detection processing unit 510 may find the hit triangles that hit with the ray through the triangle detection step, and after the triangle detection step is completed, the edge detection step may be performed based on the hit triangles.

The edge detection processing unit 530 may calculate at least an edge-point based on the hit triangles and determine whether diffraction occurs on an edge point by performing the intersection test for the test ray departing toward the at least edge point based on a sound source or a listener. The edge detection step may include a process of calculating an edge point, a process of generating a test ray, and a process of performing an intersection test for the test ray. In one embodiment, the edge detection processing unit 530 may perform the edge detection step repeatedly for each of the hit triangles. That is, the edge detection step may be repeatedly performed for each hit triangle. When the edge detection step is completed for all hit triangles detected in the triangle detection step, the final sound for the scene may be generated.

In one embodiment, the edge detection processing unit 530 may determine an edge between the hit triangle and an adjacent triangle, determine a point closer to a straight line between a sound source and a listener as an edge point among the points on the edge, and generate at least one sub-edge point by moving a predetermined value in a specific direction from the edge point. In one embodiment, the edge detection processing unit 530 may generate a first test ray departing toward a first sub-edge point from the listener, generate a second test ray departing toward a second sub-edge point from the listener, and generate a third test ray departing toward the second sub-edge point from the sound source.

In one embodiment, the edge detection processing unit 530 may determine diffraction in the edge point in the case that the first test ray hits the hit triangle, and the second and third rays do not hit the hit triangle. This will be described in detail with reference to FIG. 6.

In one embodiment, the edge detection processing unit 530 may represent an edge and a straight line with first and second vector equations, define a first vector that connects an edge and starting points and a second vector that connects the closest points between the edge and the straight line, represent the edge point with a vector equation by defining a size of vector u of the first vector equation as an unknown number, and calculate an edge point by calculating the unknown number through a dot product between each of the edge and the straight line and the second vector. In one embodiment, the edge detection processing unit 530 may generate two different sub-edge points by moving a predetermined value in a positive direction and a negative direction according to a specific direction based on the edge point. In one embodiment, the edge detection processing unit 530 may determine a first sub-edge point between the two sub-edge points when the sub-edge point is close to the listener and determine a second sub-edge point between the two sub-edge points when the sub-edge point is close to the sound source. This will be described in detail with reference to FIGS. 7 and 8.

The control unit 550 may control the overall operations of the edge detection device 130 and manage the control flow or the data flow between the triangle detection processing unit 510 and the edge detection processing unit 530.

Figure 6:
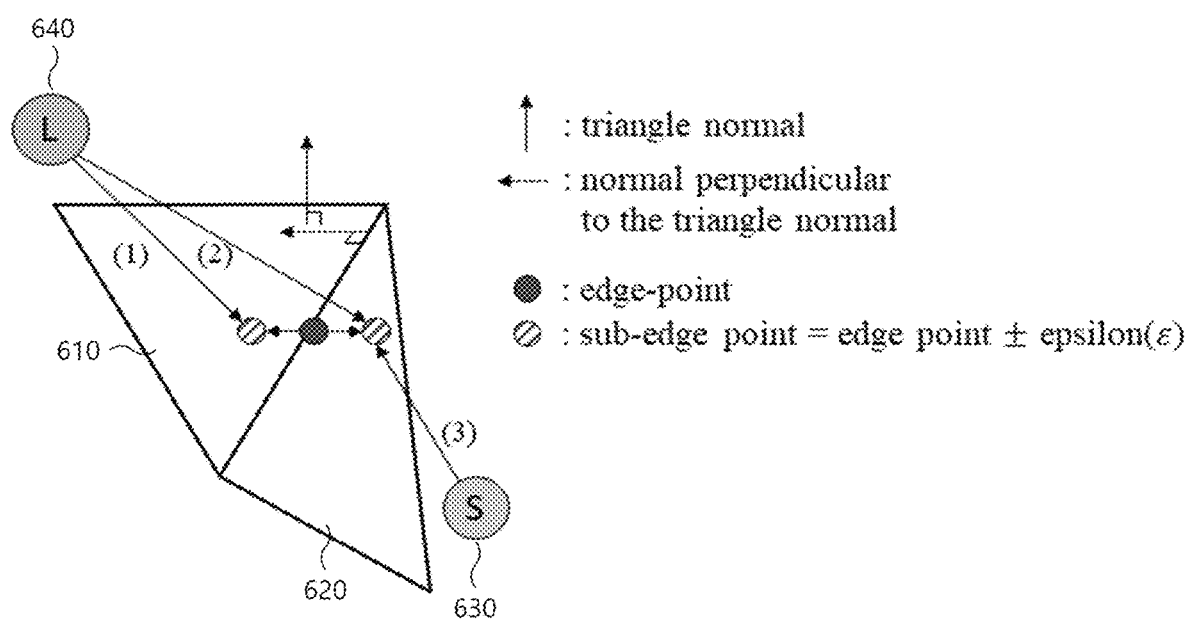
FIG. 6 is a diagram illustrating an edge detection process according to the present disclosure.

FIG. 6 is a diagram illustrating an edge detection process according to the present disclosure.

Referring to FIG. 6, a left triangle 610 may correspond to a hit triangle delivered from the triangle detection and a right triangle 620 may correspond to an adjacent triangle that shares an edge with the left triangle 610. L 640 may represent a position of a listener, S 630 may represent a position of a sound source, a red circle may represent an edge point, and a shaded circle may represent a sub-edge point. From each triangle, the arrow in an upper direction is a triangle normal, and the arrow in a left direction is a normal perpendicular to the triangle normal.

The edge point may be defined as a point closest to the straight line (LS straight line) that connects L 640 and S 630 among the points on the edge. The sub-edge point may be distinguished into 'sub-edge point+' added by epsilon (i.e., very small value) in a specific direction from the edge point and 'sub-edge point−' subtracted by epsilon (i.e., very small value) in a specific direction from the edge point. These values may be used importantly when an edge is determined to be a diffractable edge. As the specific direction, a normal perpendicular to the triangle normal may be used. The normal perpendicular to the triangle normal may be calculated by using a cross product between the triangle normal and the edge. If the sub-edge point is close to L, the sub-edge point is defined as the sub-edge point−, otherwise, the sub-edge point is defined as the sub-edge point+. In this case, the sub-edge point− may correspond to the first sub-edge point, and the sub-edge point+ may correspond to the second sub-edge point.

In FIG. 6, ray (1), ray (2), and ray (3) are rays for performing the edge detection. Ray (1) is a ray shot from L 640 to the sub-edge point−. Ray (2) is a ray shot from L 640 to the sub-edge point+. Lastly, ray (3) is a ray shot from S 630 to the sub-edge point+. That is, ray (1), ray (2), and ray (3) may correspond to the first to third test rays.

According to the core idea of the edge detection, an edge point may be calculated for a triangle hit with the ray first, and then, based on the value, the sub-edge point− and the sub-edge point+ may be calculated, and through this, ray (1), ray (2), and ray (3) may be calculated respectively. In FIG. 6, if ray (1) hits the triangle, and ray (2) and ray (3) do not hit the triangle, the edge may be determined to be an edge in which diffraction may occur.

Figure 7:
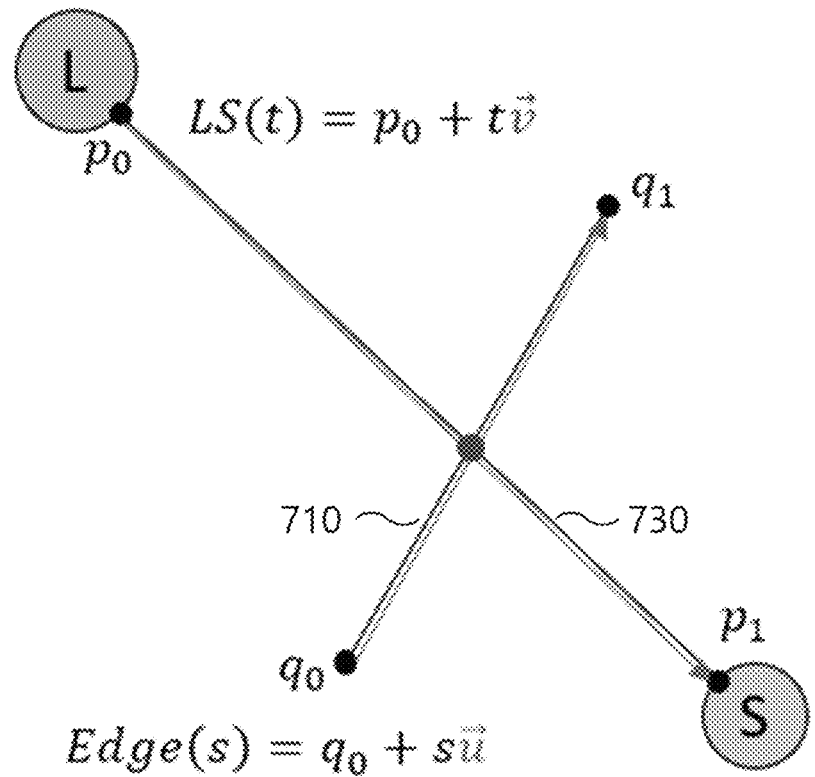
FIGS. 7 and 8 are diagrams illustrating a calculation process of an edge point according to the present disclosure.
Figure 8:
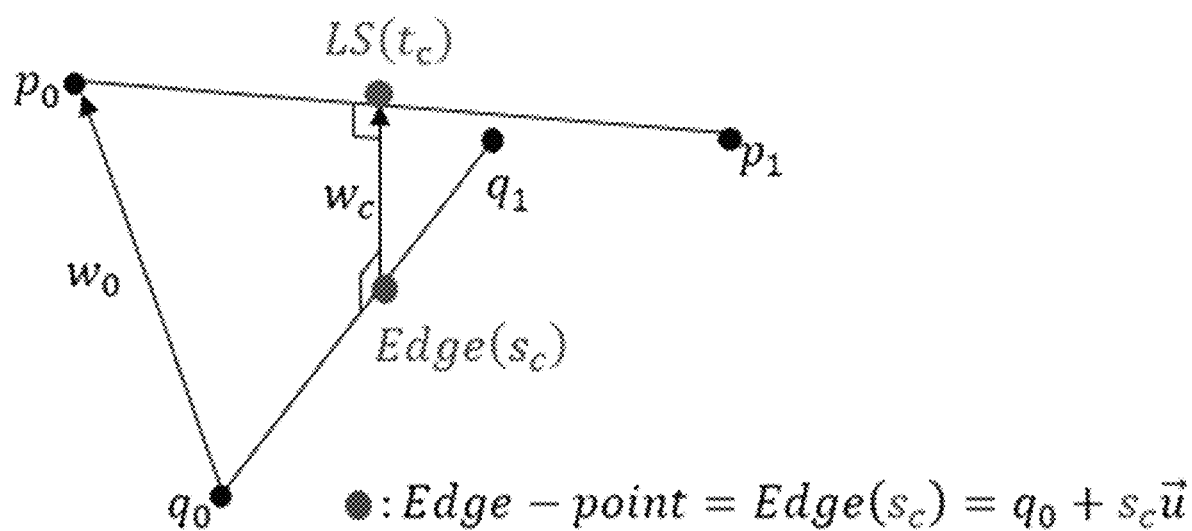

FIGS. 7 and 8 are diagrams illustrating a calculation process of an edge point according to the present disclosure.

FIG. 7 shows an edge straight line 710 and an LS straight line 730 in FIG. 6 as a top-view to calculate an edge point. That is, the LS straight line 730 and the edge straight line 710 may be represented by the corresponding vector equations. The LS straight line 730 may be represented as $LS(t) = p_0 + t\vec{v}$ using a vector v in (L→S) direction, a size of vector t, and a starting point $p_0$. The edge straight line 710 may be represented as $Edge(s) = q_0 + s\vec{u}$ using a vector u in ($q_0 \rightarrow q_1$) direction, a size of vector s, and a starting point $q_0$.

Referring to FIG. 8, a front-view of FIG. 7 is shown, and the embodiment of finding the closest point (red circle based on the edge) between two straight lines is shown. $w_0$ is a vector that connects the starting points of the LS straight line and the edge straight line. That is, $w_0$ is a vector toward $p_0$ from $q_0$. $w_c$ is a vector that connects the closest two points between the two straight lines.

In addition, in order to represent the edge point by a vector equation, a size of vector u may be defined as an unknown number $s_c$. That is, the edge point may be represented as $q_0 + s_c \vec{u}$. If it is possible to obtain unknown number $s_c$, the edge point may be calculated.

The closest point between the two straight lines may be a point at which the two straight lines are perpendicular to $w_c$. The fact that the two straight lines are perpendicular may mean that a dot product between two straight lines is zero. By using the property, a value of $s_c$ may be obtained.

Figure 9:
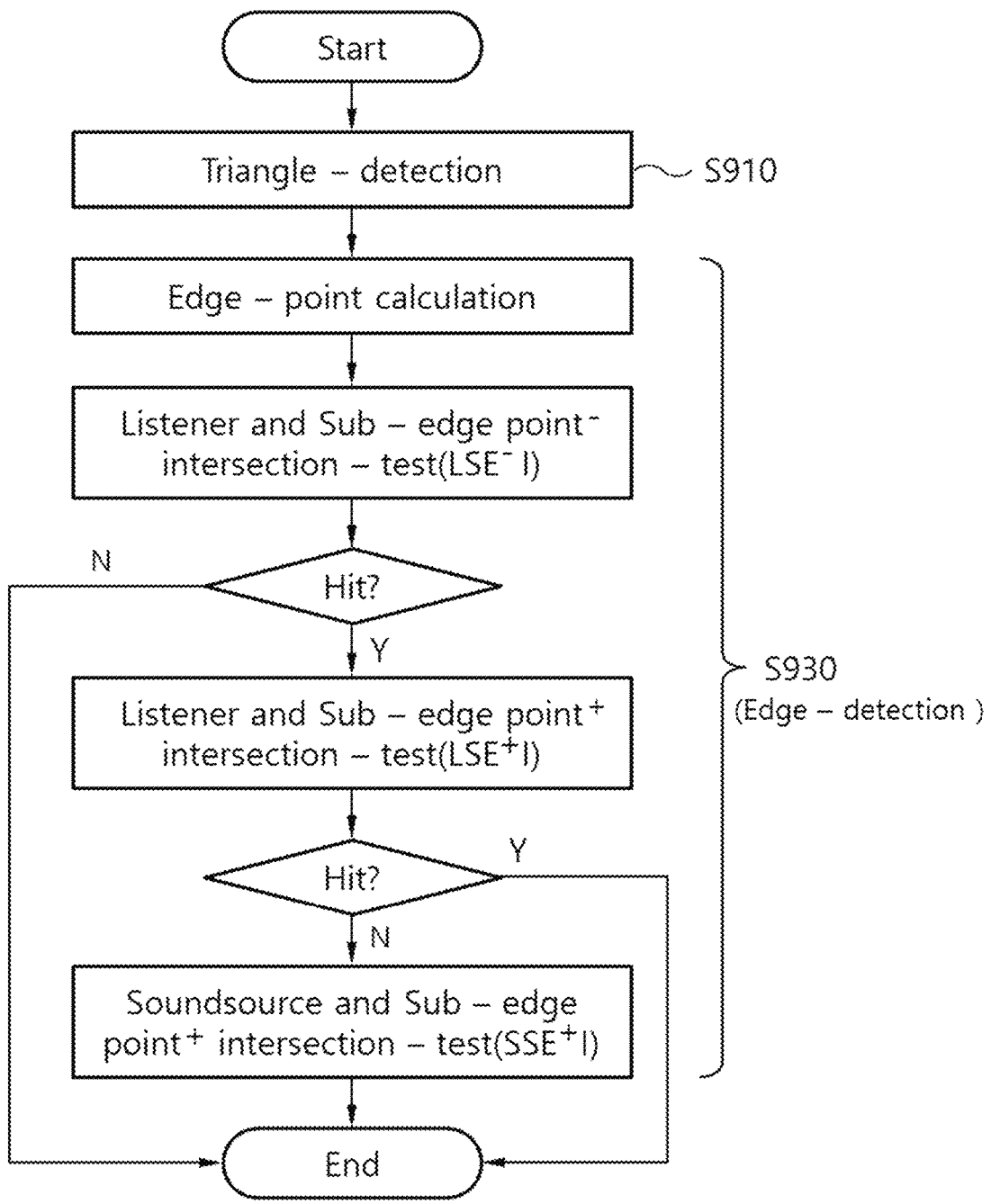
FIG. 9 is a flowchart illustrating an edge detection process according to the present disclosure.

FIG. 9 is a flowchart illustrating an edge detection process according to the present disclosure.

Referring to FIG. 9, first, a triangle detection may be performed, and triangles hit with a ray shot from a sound source may be found (step, S910). Thereafter, the edge detection process according to the present disclosure may be performed. In the edge detection process, an edge point, a sub-edge point+ and a sub-edge point− for the hit triangle may be calculated as described above. Thereafter, based on the information, it is examined whether the edge is diffractable. For this, LSE−I, LSE+I, and SSE+I steps may be sequentially performed (step S930). The process may correspond to the edge detection and may be performed repeatedly for each of the triangles detected through the triangle detection (step S910).

More particularly, LSE−I may be a process corresponding to ray (1) of FIG. 6, in the process, a ray may be shot in the sub-edge point− direction from a listener, and an intersection test may be performed. If the shot ray hit a certain triangle, the intersection test may be determined to be successful, and the next step LSE+I may be performed. Otherwise, the algorithm may be terminated.

LSE+I may be a process corresponding to ray (2) of FIG. 6, in the process, in the process, a ray may be shot in the sub-edge point+ direction from a listener, and an intersection test may be performed. If the shot ray does not hit a certain triangle, the intersection test may be determined to be successful, and the next step SSE+I may be performed. Otherwise, the algorithm may be terminated.

SSE+I may be a process corresponding to ray (3) of FIG. 6, in the process, in the process, a ray may be shot in the sub-edge point+ direction from a sound source, and an intersection test may be performed. If the shot ray does not hit a certain triangle, the intersection test may be determined to be successful, and finally, the edge may be determined to be diffractable. A series of tasks may be performed for all triangles calculated through the triangle detection step (step S910).

The edge detection method according to the present disclosure has a distinguishable feature in which a diffractable edge is found during a run-time in a dynamic scene. According to the conventional sound tracing, edge candidates are calculated and stored in a pre-processing step, and a response is impossible in a dynamic scene. However, according to the present disclosure, edges are found in every frame, and a response is possible even in a dynamic scene. Through this, users may feel more realistic and immersive sound.

So far, the present disclosure is described with reference to a preferred embodiment, but it will be apparent to those skilled in the art that various modifications and variations may be made in the present disclosure without departing from the spirit or scope of the disclosure.

| [Detailed Description of Main Elements] | |
| --- | --- |
| 500: edge detection device | |
| 510: triangle detection processing unit | 530: edge detection processing unit |
| 550: control unit | |
| 610: left triangle | 620: right triangle |
| 630: S (position of sound source) | 640: L (position of listener) |
| 710: edge straight line | 730: LS straight line |

The invention claimed is:

1. An edge detection method for diffraction of sound tracing, comprising:
a triangle detection step for detecting hit triangles hit with a ray departing from a sound source; and
an edge detection step for calculating at least an edge point based on the hit triangles and determining whether diffraction occurs on the edge point by performing an intersection test for a test ray departing toward the at least edge point based on the sound source or a listener,
wherein the edge detection step includes:
determining an edge between the hit triangle and an adjacent triangle;
determining a point closest to a straight line between the sound source and the listener as an edge point among the points on the edge; and
generating at least one sub-edge point by moving a predetermined value in a specific direction from the edge point, and
wherein the edge detection step further includes:
generating two different sub-edge points by moving the predetermined value in a positive direction and a negative direction according to the specific direction based on the edge point.

2. The edge detection method for diffraction of sound tracing of claim 1, wherein the triangle detection step includes:
generating a ray by defining an origin and a direction;
searching an acceleration structure (AS) for a 3-dimensional space in which the sound source is located; and
determining the hit triangles by performing the intersection test between the ray and the triangle while searching the triangles of the acceleration structure.

3. The edge detection method for diffraction of sound tracing of claim 1, wherein the edge detection step includes:
representing the edge and the straight line with first and second vector equations;
defining a first vector that connects the edge and starting points of the straight line and a second vector that connects the closest points between the edge and the straight line;
representing the edge point with a vector equation by defining a size of vector u of the first vector equation as an unknown number; and
calculating the edge point by calculating the unknown number through a dot product between each of the edge and the straight line and the second vector.

4. The edge detection method for diffraction of sound tracing of claim 1, wherein the edge detection step includes:
determining a first sub-edge point between the two sub-edge points when the sub-edge point is close to the listener and determining a second sub-edge point between the two sub-edge points when the sub-edge point is close to the sound source.

5. The edge detection method for diffraction of sound tracing of claim 4, wherein the edge detection step includes:
generating a first test ray departing toward a first sub-edge point from the listener;
generating a second test ray departing toward a second sub-edge point from the listener; and
generating a third test ray departing toward the second sub-edge point from the sound source.

6. The edge detection method for diffraction of sound tracing of claim 5, wherein the edge detection step includes:
determining diffraction in the edge point based on the first test ray hitting the hit triangle, and the second and third rays not hitting the hit triangle.

7. The edge detection method for diffraction of sound tracing of claim 1, wherein the edge detection step is repeatedly performed for each of the hit triangles.

8. An edge detection device for diffraction of sound tracing, comprising:
a triangle detection processing unit for detecting hit triangles hit with a ray departing from a sound source; and
an edge detection processing unit for calculating at least an edge point based on the hit triangles and determining whether diffraction occurs on the edge point by performing an intersection test for a test ray departing toward the at least edge point based on the sound source or a listener,
wherein the edge detection processing unit determines an edge between the hit triangle and an adjacent triangle and determines a point closest to a straight line between the sound source and the listener as an edge point among the points on the edge, and
wherein the edge detection processing unit generates two different sub-edge points by moving the predetermined value in a positive direction and a negative direction according to the specific direction based on the edge point.

9. The edge detection device for diffraction of sound tracing of claim 8, wherein the edge detection processing unit determines a first sub-edge point between the two sub-edge points when the sub-edge point is close to the listener and determines a second sub-edge point between the two sub-edge points when the sub-edge point is close to the sound source.

10. The edge detection device for diffraction of sound tracing of claim 9, wherein the edge detection processing unit determines whether diffraction occurs on the edge point based on a first test ray departing toward a first sub-edge point from the listener, a second test ray departing toward a second sub-edge point from the listener, and a third test ray departing toward the second sub-edge point from the sound source.

* * * * *